(12) United States Patent
Kim et al.

(10) Patent No.: US 12,079,964 B2
(45) Date of Patent: Sep. 3, 2024

(54) IMAGE PROCESSING APPARATUS AND OPERATION METHOD THEREOF

(71) Applicant: SAMSUNG ELECTRONICS CO., LTD., Suwon-si (KR)

(72) Inventors: Bongjoe Kim, Suwon-si (KR); Kyuha Choi, Suwon-si (KR); Seungho Park, Suwon-si (KR); Sangjo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 17/573,010

(22) Filed: Jan. 11, 2022

(65) Prior Publication Data
US 2022/0245767 A1 Aug. 4, 2022

Related U.S. Application Data

(63) Continuation of application No. PCT/KR2021/017759, filed on Nov. 29, 2021.

(30) Foreign Application Priority Data

Jan. 27, 2021 (KR) .......... 10-2021-0011803

(51) Int. Cl.
*G06T 5/70* (2024.01)
*G06T 5/50* (2006.01)
*G06T 7/00* (2017.01)

(52) U.S. Cl.
CPC ............ *G06T 5/70* (2024.01); *G06T 5/50* (2013.01); *G06T 7/0002* (2013.01); *G06T 2207/20084* (2013.01)

(58) Field of Classification Search
CPC .......... G06T 5/70; G06T 5/50; G06T 7/0002; G06T 2207/20084; G06T 5/60;
(Continued)

(56) References Cited

U.S. PATENT DOCUMENTS 9,536,284 B2 1/2017 Liege et al.
10,467,507 B1 * 11/2019 Hao ................... G06F 18/2415
(Continued)

FOREIGN PATENT DOCUMENTS

KR 10-0940147 2/2010
KR 10-2019-0030339 3/2019
(Continued)

OTHER PUBLICATIONS

Bian, Tianliang. "An ensemble image quality assessment algorithm based on deep feature clustering." Signal Processing: Image Communication 81 (2020): 115703.*
(Continued)

*Primary Examiner* — Xuemei G Chen
(74) *Attorney, Agent, or Firm* — Nixon & Vanderhye P.C.

(57) ABSTRACT

An image processing apparatus includes: a memory storing one or more instructions; and a processor by executing the one or more instructions stored in the memory is configured to: extract a first image feature from a first image; search for, based on a transmission characteristic of the first image and the first image feature, a first cluster corresponding to the first image from among a plurality of clusters stored in the image processing apparatus, each cluster including a representative image feature and a representative image quality parameter; perform image quality processing on the first image based on a first representative image quality parameter in the first cluster; obtain, based on the first image that has undergone the image quality processing, a first update parameter obtained by updating the first representative image quality parameter; and update the plurality of clusters based on the first update parameter.

15 Claims, 13 Drawing Sheets

(58) Field of Classification Search
CPC ............. G06T 5/73; G06T 2207/20081; G06T 2207/30168; G06T 3/40; G06T 7/13; G06T 5/00; G06N 3/08
See application file for complete search history.

(56) References Cited

U.S. PATENT DOCUMENTS

| | | | |
|---|---|---|---|
| 11,138,437 B2 | 10/2021 | Cho et al. | |
| 11,475,684 B1* | 10/2022 | Deng | G06V 40/50 |
| 2012/0154831 A1* | 6/2012 | Wu | H04N 1/6033 358/1.9 |
| 2012/0200897 A1* | 8/2012 | Mestha | H04N 1/6033 358/3.27 |
| 2014/0185943 A1* | 7/2014 | Simske | G06F 18/24 382/218 |
| 2015/0206169 A1* | 7/2015 | Ye | G06Q 30/0242 705/14.41 |
| 2018/0075318 A1* | 3/2018 | Chu | G06V 10/764 |
| 2019/0073520 A1* | 3/2019 | Ayyar | G06V 40/173 |
| 2019/0082177 A1 | 3/2019 | Cho et al. | |
| 2019/0122345 A1 | 4/2019 | Kamio et al. | |
| 2020/0175675 A1* | 6/2020 | Ogino | A61B 5/00 |
| 2020/0210768 A1* | 7/2020 | Turkelson | G06V 40/63 |
| 2020/0211172 A1 | 7/2020 | Nam et al. | |
| 2021/0400231 A1 | 12/2021 | Park et al. | |
| 2022/0086462 A1 | 3/2022 | Shin et al. | |
| 2023/0071400 A1* | 3/2023 | Abdolell | G16H 30/20 |
| 2024/0098215 A1 | 3/2024 | Park et al. | |

FOREIGN PATENT DOCUMENTS

| | | |
|---|---|---|
| KR | 10-2019-0048196 | 5/2019 |
| KR | 10-2019-0103047 | 9/2019 |
| KR | 10-2020-0026759 | 3/2020 |
| KR | 10-2020-0045740 | 5/2020 |
| KR | 10-2020-0057474 | 5/2020 |
| KR | 10-2020-0073078 | 6/2020 |
| KR | 10-2020-0084452 | 7/2020 |
| WO | WO 2020/085781 A1 | 4/2020 |

OTHER PUBLICATIONS

J. Xu, P. Ye, Q. Li, H. Du, Y. Liu and D. Doermann, "Blind Image Quality Assessment Based on High Order Statistics Aggregation," in IEEE Transactions on Image Processing, vol. 25, No. 9, pp. 4444-4457, Sep. 2016.*
Kang et al., "Convolutional Neural Networks for No-Reference Image Quality Assessment", CVPR Paper, IEEE Xplore, 2014, 8 pages.
Extended European Search Report dated Jan. 22, 2024 for EP Application No. 21923404.4.
Yu Ke et al: "Crafting a Toolchain for Image Restoration by Deep Reinforcement Learning", 2018 IEEE/CVF Conference on Computer Vision and Pattern Recognition, IEEE, Jun. 18, 2018 (Jun. 18, 2018), pp. 2443-2452, XP033476210.
Wu Meiyin et al: "A hybrid learning-based framework for blind image quality assessment", Multidimensional Systems and Signal Processing, Springer US, Boston, vol. 29, No. 3, Feb. 20, 2017 (Feb. 20, 2017), pp. 839-849, XP036462913.

* cited by examiner

IMAGE PROCESSING APPARATUS AND OPERATION METHOD THEREOF

CROSS-REFERENCE TO RELATED APPLICATIONS

This application is a continuation of International Application No. PCT/KR2021/017759 designating the United States, filed on Nov. 29, 2021, in the Korean Intellectual Property Receiving Office and claiming priority to Korean Patent Application No. 10-2021-0011803, filed on Jan. 27, 2021, in the Korean Intellectual Property Office, the disclosures of which are incorporated by reference herein in their entireties.

BACKGROUND

Field

The disclosure relates to image processing apparatuses and operation methods thereof, and for example, to image processing apparatuses and operation methods for performing image quality processing on an image based on image quality parameters of the image.

Description of Related Art

To provide an improved image quality, an image processing apparatus performs quality processing on an image using image quality parameters. In this case, as a method of setting the image quality parameters, a rule-based parameter setting method and a deep learning-based parameter setting method are used.

The rule-based parameter setting method may refer, for example, to a method of detecting image features, such as a texture, edges, a location or intensity of noise included in an image, etc., and setting predefined parameters corresponding to the detected image features.

In addition, the deep learning-based parameter setting method may refer, for example, to a method of extracting features of an image using a deep neural network, and setting image quality parameters obtained using the extracted features.

SUMMARY

Embodiments of the disclosure may provide an image processing apparatus and an operation method thereof, which are capable of determining image quality parameters based on transmission characteristics of an image and image features, performing image quality processing on the image based on the determined image quality parameters, and updating the image quality parameters in a direction in which the quality of the image is improved.

According to an example embodiment of the disclosure, an image processing apparatus includes: a memory storing one or more instructions; and a processor by executing the one or more instructions stored in the memory is configured to: extract a first image feature from a first image; search for, based on a transmission characteristic of the first image and the first image feature, a first cluster corresponding to the first image from among a plurality of clusters stored in the image processing apparatus, each cluster including a representative image feature and a representative image quality parameter; perform image quality processing on the first image based on a first representative image quality parameter in the first cluster; obtain, based on the first image that has undergone the image quality processing, a first update parameter obtained by updating the first representative image quality parameter; and update the plurality of clusters based on the first update parameter.

According to an example embodiment of the disclosure, the processor may be further configured to: obtain an image feature and an initial parameter corresponding to each of a plurality of images; perform image quality processing on each of the plurality of images based on the obtained initial parameter; and obtain, based on an image that has undergone the image quality processing, an update parameter obtained by updating the initial parameter; and generate the plurality of clusters using transmission characteristics, image features, and update parameters respectively corresponding to the plurality of images.

According to an example embodiment of the disclosure, the processor may be further configured to obtain the image feature and the initial parameter corresponding to each of the plurality of images using a parameter neural network.

According to an example embodiment of the disclosure, the processor may be further configured to: determine an update direction for the initial parameter based on the image that has undergone the image quality processing; and obtain the update parameter by updating the initial parameter by applying a preset value in the update direction.

According to an example embodiment of the disclosure, the processor may be further configured to determine, using a parameter update neural network, the update direction indicating whether to increase or decrease a value of the initial parameter applied to the image that has undergone the image quality processing.

According to an example embodiment of the disclosure, the processor may be further configured to: group, based on the transmission characteristics of the plurality of images, pieces of raw data including image features and update parameters respectively corresponding to the plurality of images; perform clustering to classify pieces of raw data in a same group into K clusters; and determine, based on pieces of raw data included in a same cluster, the representative image feature and the representative image quality parameter for each of the plurality of clusters.

According to an example embodiment of the disclosure, the processor may be further configured to perform the clustering based on the number of the pieces of raw data in the same group being greater than or equal to a preset number.

According to an example embodiment of the disclosure, the image processing apparatus may further include a communicator comprising communication circuitry, and the processor may be further configured to control the communicator to receive cluster information including the plurality of clusters from an external server.

According to an example embodiment of the disclosure, the processor may be further configured to control the communicator to: transmit the transmission characteristic of the first image to the external server and receive cluster information corresponding to the transmission characteristic of the first image.

According to an example embodiment of the disclosure, the processor may be further configured to control the communicator to transmit the cluster information including the plurality of clusters to the external server.

According to an example embodiment of the disclosure, a method of operating an image processing apparatus includes: extracting a first image feature from a first image; searching for, based on a transmission characteristic of the first image and the first image feature, a first cluster corresponding to the first image from among a plurality of clusters stored in the image processing apparatus, each cluster including a representative image feature and a representative image quality parameter; performing image quality processing on the first image based on a first representative image quality parameter in the first cluster; obtaining, based on the first image that has undergone the image quality processing, a first update parameter obtained by updating the first representative image quality parameter; and updating the plurality of clusters based on the first update parameter.

According to an example embodiment of the disclosure, an image processing apparatus may update, based on an image that has undergone image quality processing, image quality parameters used for the image quality processing in a direction in which the quality of the image is improved, thereby enabling continuous image quality improvement based on a latest viewing history of a user of the image processing apparatus.

According to an example embodiment of the disclosure, an image processing apparatus may use image quality parameters updated by another image processing apparatus through interworking with an external server that collects and manages image quality parameters. Accordingly, even in the case of an image that the user of the image processing apparatus sees for the first time, image quality processing may be performed on the image using optimized image quality parameters. In addition, hardware resource constraints on the image processing apparatus may be overcome through interworking with the external server.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
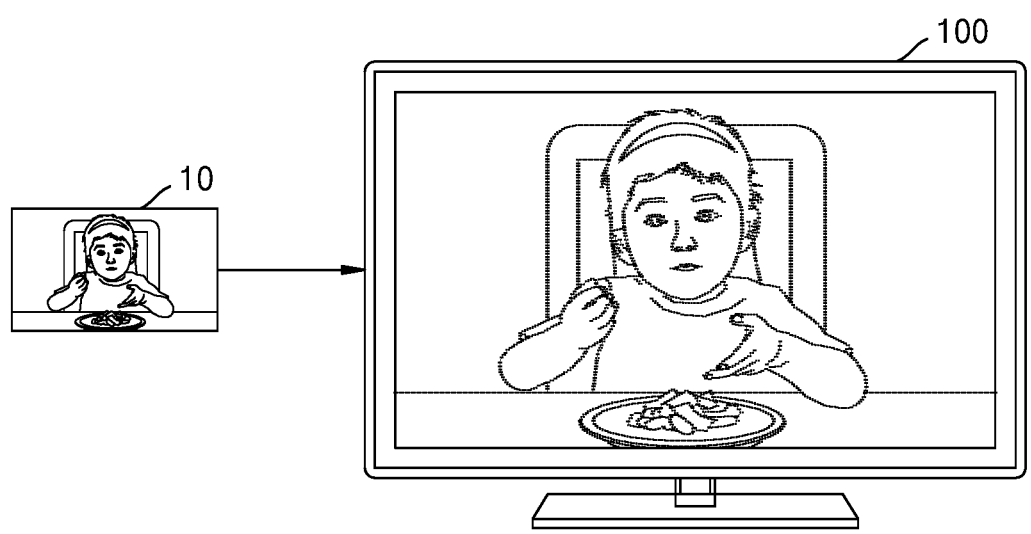
FIG. 1 is a diagram illustrating an example image processing apparatus according to various embodiments.

Throughout the disclosure, the expression "at least one of a, b or c" indicates only a, only b, only c, both a and b, both a and c, both b and c, all of a, b, and c, or variations thereof.

Terms used in the present disclosure will now be briefly described and then the disclosure will be described in greater detail.

The terms used in the disclosure are general terms currently widely used in the art based on functions described in the disclosure, but may have different meanings according to an intention of a technician engaged in the art, precedent cases, advent of new technologies, etc. Furthermore, some particular terms may be arbitrarily selected, and in this case, the meaning of the selected terms will be described in detail in the disclosure. Thus, the terms used herein should be defined not by simple appellations thereof but based on the meaning of the terms together with the overall description of the disclosure.

Throughout the disclosure, when a part "includes" or "comprises" an element, unless there is a particular description contrary thereto, it is understood that the part may further include other elements, not excluding the other elements. Furthermore, terms such as "portion," "module," etc. used herein indicate a unit for processing at least one function or operation and may be implemented as hardware or software or a combination of hardware and software.

Embodiments of the disclosure will now be described more fully hereinafter with reference to the accompanying drawings. However, the disclosure may be implemented in different forms and should not be construed as being limited to the embodiments set forth herein. In addition, parts not related to descriptions of the disclosure may be omitted to clearly explain embodiments of the disclosure in the drawings, and like reference numerals denote like elements throughout.

In embodiments of the present disclosure, the term "user" may refer to a person who controls a system, function, or operation, and may include a developer, an administrator, or an installation engineer.

Furthermore, in the various example embodiments of the present disclosure, an 'image' or a 'picture' may be a still image, a moving image including a plurality of continuous still images (or frames), or a video.

FIG. 1 is a diagram illustrating an example image processing apparatus according to various embodiments.

Referring to FIG. 1, the image processing apparatus 100 according to the embodiment of the disclosure may be an electronic device that receives an image and processes a quality of the received image. For example, the image processing apparatus 100 may be implemented in various forms, such as, for example, and without limitation, a TV, a mobile phone, a tablet PC, a digital camera, a camcorder, a laptop computer, a desktop computer, an e-book terminal, a digital broadcasting terminal, and a personal digital assistant (PDA), a portable multimedia player (PMP), a navigation device, an MP3 player, a wearable device, etc. Furthermore, the image processing apparatus 100 may include a display, and display, on the display, an image that has undergone image quality processing. In addition, the image processing apparatus 100 may be a stationary electronic device arranged at a fixed location or a mobile electronic device having a portable form, and may be a digital broadcasting receiver capable of receiving digital broadcasts. For example, embodiments of the disclosure may be easily implemented in an image processing apparatus having a large-sized display, such as a TV, but are not limited thereto.

According to an embodiment of the disclosure, the image processing apparatus 100 may perform image quality processing on an image 10 received or input from an external device or an external server, and display an image that has undergone the image quality processing on a display. In this case, the image quality processing may include processing such as noise removal and detail enhancement, but is not limited thereto.

According to an embodiment of the disclosure, the image processing apparatus 100 may determine image quality parameters based on transmission characteristics of the input image (e.g., an input resolution, a bitrate, information about an image source, etc.) and image features (e.g., information about a texture, noise, edges, etc. included in the image 10). The image processing apparatus 100 may perform image quality processing using the determined image quality parameters. For example, the image processing apparatus 100 may perform noise removal using a first image quality parameter, and detail enhancement using a second image quality parameter.

According to an embodiment of the disclosure, the image processing apparatus 100 may update, based on the image that has undergone the image quality processing, image quality parameters used for the image quality processing in a direction in which quality of the image is improved. In addition, according to an embodiment of the disclosure, the image processing apparatus 100 may use image quality parameters updated by another image processing apparatus through interworking with an external server that collects and manages image quality parameters. Accordingly, even in the case of an image that a viewer of the image processing apparatus 100 sees for the first time, image quality processing may be performed on the image using optimized image quality parameters. Hereinafter, various example embodiments of the disclosure will be described in greater detail with reference to the drawings.

Figure 2:
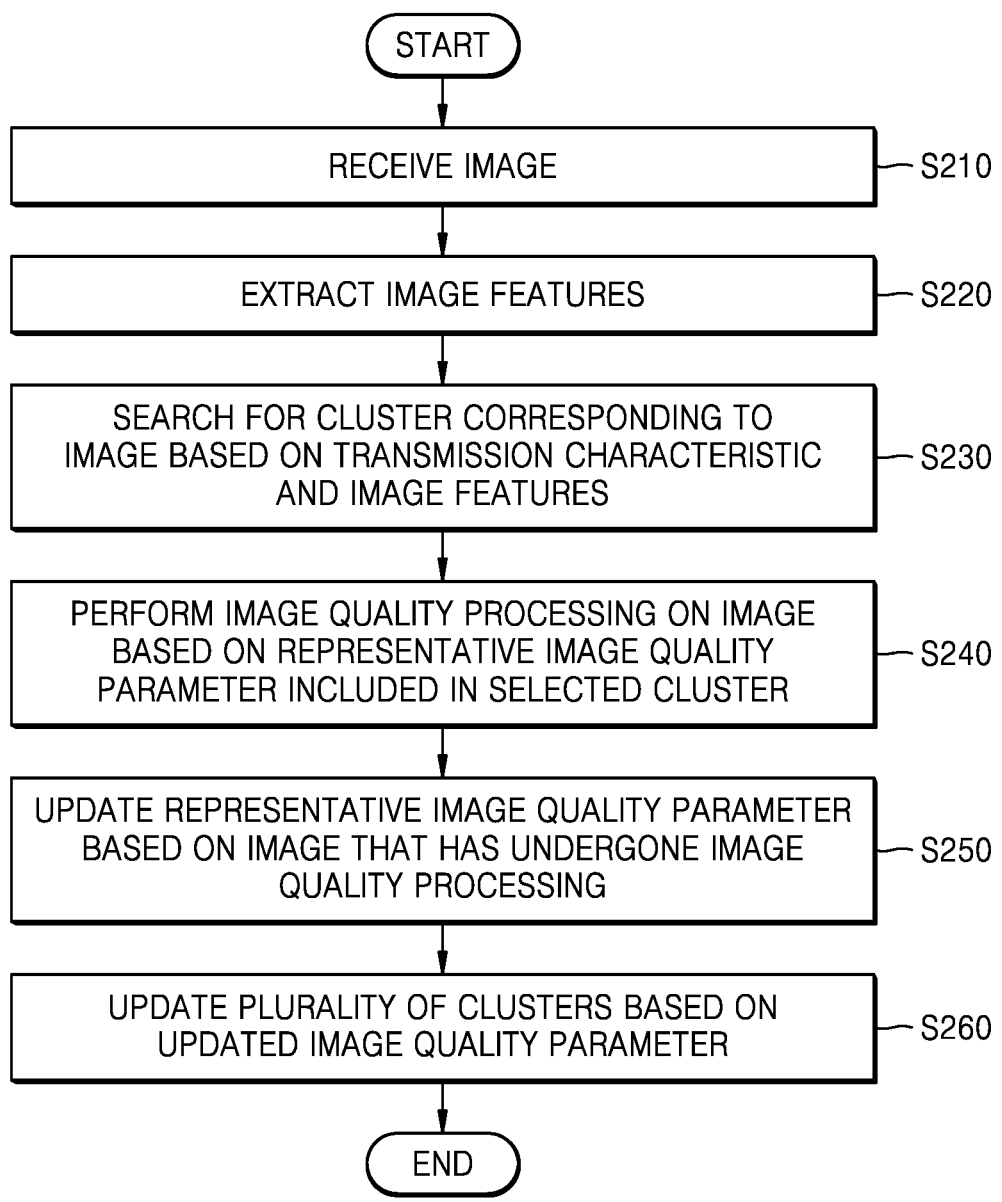
FIG. 2 is a flowchart illustrating an example method of operating an image processing apparatus, according to various embodiments.

FIG. 2 is a flowchart illustrating an example method of operating the image processing apparatus, according to various embodiments.

Referring to FIG. 2, according to an embodiment of the disclosure, the image processing apparatus 100 may receive an image (operation S210), and in this case, receive the image together with transmission characteristics of the image (e.g., an input resolution, a bitrate, information about an image source, etc.)

The image processing apparatus 100 may extract image features from the received image (operation S220). For example, the image processing apparatus 100 may extract image features from the image using a feature extraction network including one or more convolutional layers. The feature extraction network may be a neural network trained to receive an image and extract image features from the input image.

The image processing apparatus 100 may search for a cluster corresponding to the received image in, for example, prestored cluster information, based on a transmission characteristic of the image and the image features (operation S230). In this case, the prestored cluster information may include cluster tables respectively corresponding to transmission characteristics, and each cluster table includes a plurality of clusters, each cluster including a representative image feature and a representative image quality parameter corresponding to the representative image feature.

In addition, the prestored cluster information may include information generated by the image processing apparatus 100 or information received from an external server or an external device. A method, performed by the image processing apparatus 100, of generating cluster information will be described in greater detail below with reference to FIG. 9.

According to an embodiment of the disclosure, the image processing apparatus 100 may select one of a plurality of cluster tables based on a transmission characteristic of the image, and select one of a plurality of clusters included in the selected cluster table based on image features.

The image processing apparatus 100 may perform image quality processing on the received image based on a representative image quality parameter included in the selected cluster (operation S240). In this case, the representative image quality parameter may include a plurality of image quality parameters. For example, the representative image quality parameter may include a first image quality parameter applied to first image quality processing (e.g., noise removal) and a second image quality parameter applied to second image quality processing (e.g., detail enhancement), but is not limited thereto.

The image processing apparatus 100 may update the representative image quality parameter based on an image that has undergone the image quality processing (operation S250).

For example, the image processing apparatus 100 may determine an update direction for the representative image quality parameter applied to the image quality processing, and update the representative image quality parameter by applying a preset value in the determined update direction.

The image processing apparatus 100 may update a plurality of clusters included in cluster information based on the updated image quality parameter (operation S260).

For example, the image processing apparatus 100 may store the updated image quality parameter, and when the number of stored image quality parameters reaches a preset number, perform clustering to update the plurality of clusters.

Figure 3:
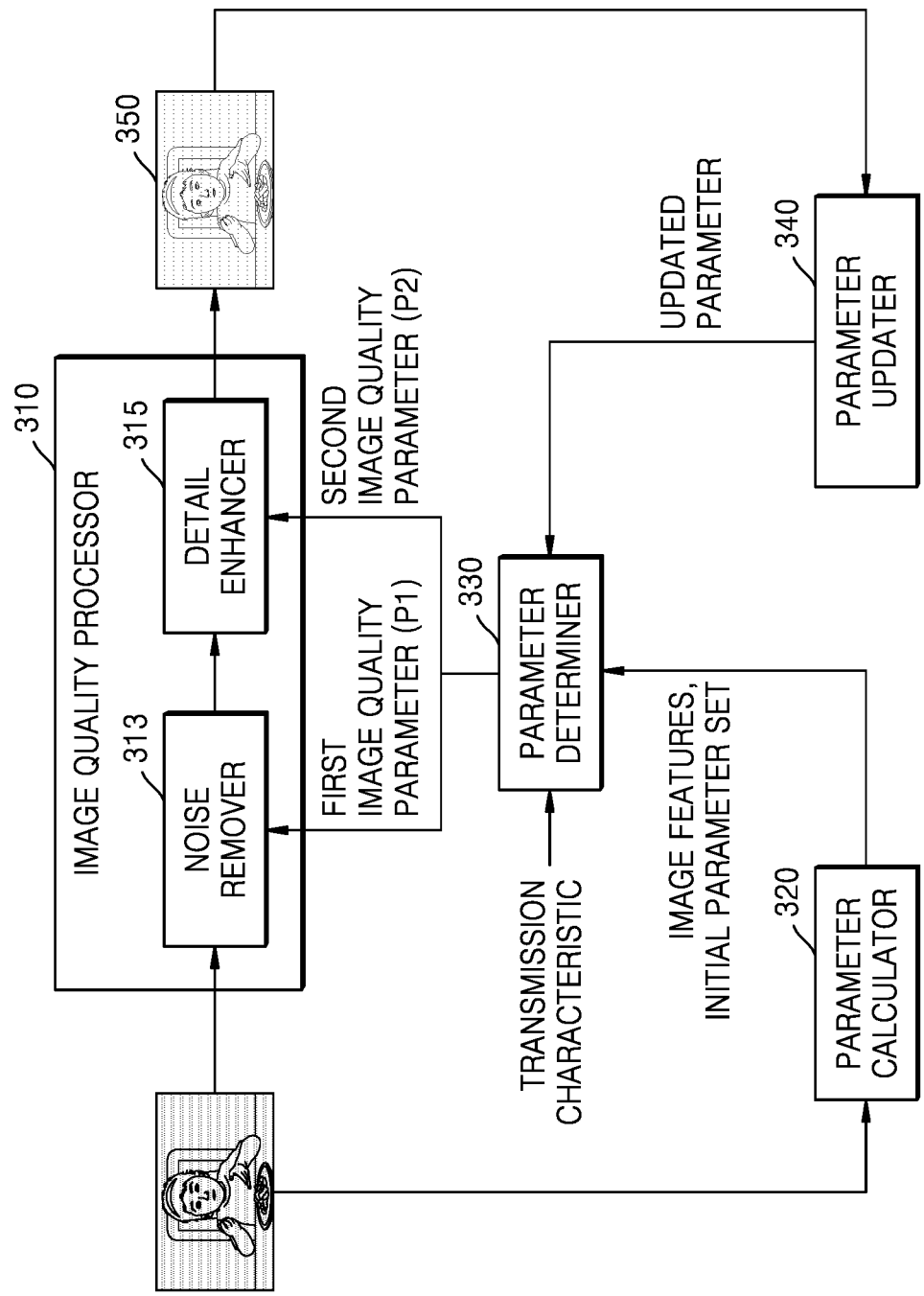
FIG. 3 is a block diagram illustrating an example configuration of an image processing apparatus according to various embodiments.

FIG. 3 is a block diagram illustrating an example configuration of the image processing apparatus according to various embodiments.

Referring to FIG. 3, the image processing apparatus 100 according to the embodiment of the disclosure may include an image quality processor (e.g., including image processing circuitry) 310, a parameter calculator (e.g., including various processing circuitry and/or executable program instructions) 320, a parameter determiner (e.g., including various processing circuitry and/or executable program instructions) 330, and a parameter updater (e.g., including various processing circuitry and/or executable program instructions) 340.

The parameter calculator 320 may include various processing circuitry and/or executable program instructions and obtain image features and image quality parameters for an image. For example, the parameter calculator 320 may include a parameter neural network, and extract image features from the image and obtain image quality parameters using the parameter neural network, as described in greater detail below with reference to FIGS. 4 and 5.

Figure 4:
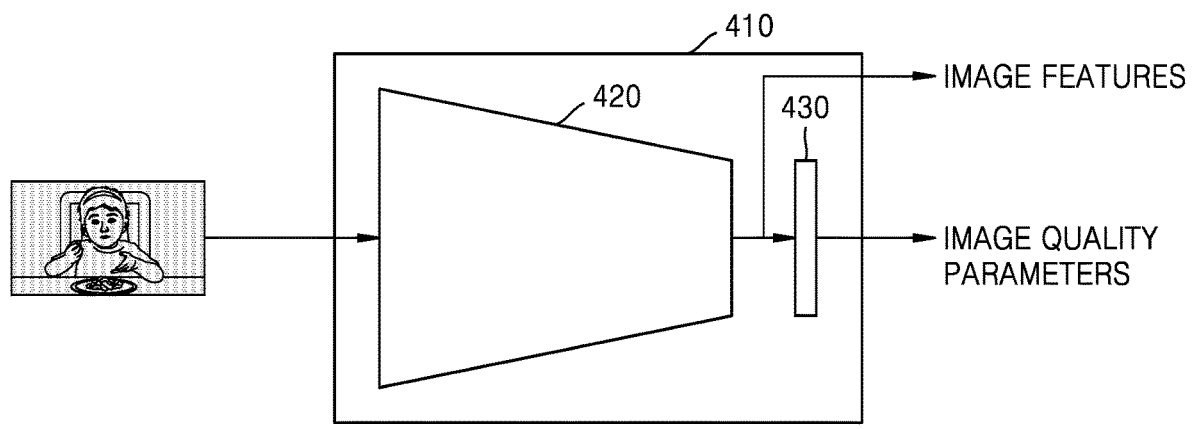
FIG. 4 is a diagram illustrating an example parameter neural network according to various embodiments.

FIG. 4 is a diagram illustrating an example parameter neural network according to various embodiments.

Referring to FIG. 4, a parameter neural network 410 according to an embodiment of the disclosure may include, for example, a deep neural network that receives an image and outputs an image quality parameter. For example, the parameter neural network 410 may include a feature extraction network 420 including one or more convolutional layers for extracting image features from an image, and a full connected layer 430 that receives the image features and outputs image quality parameters.

Figure 5:
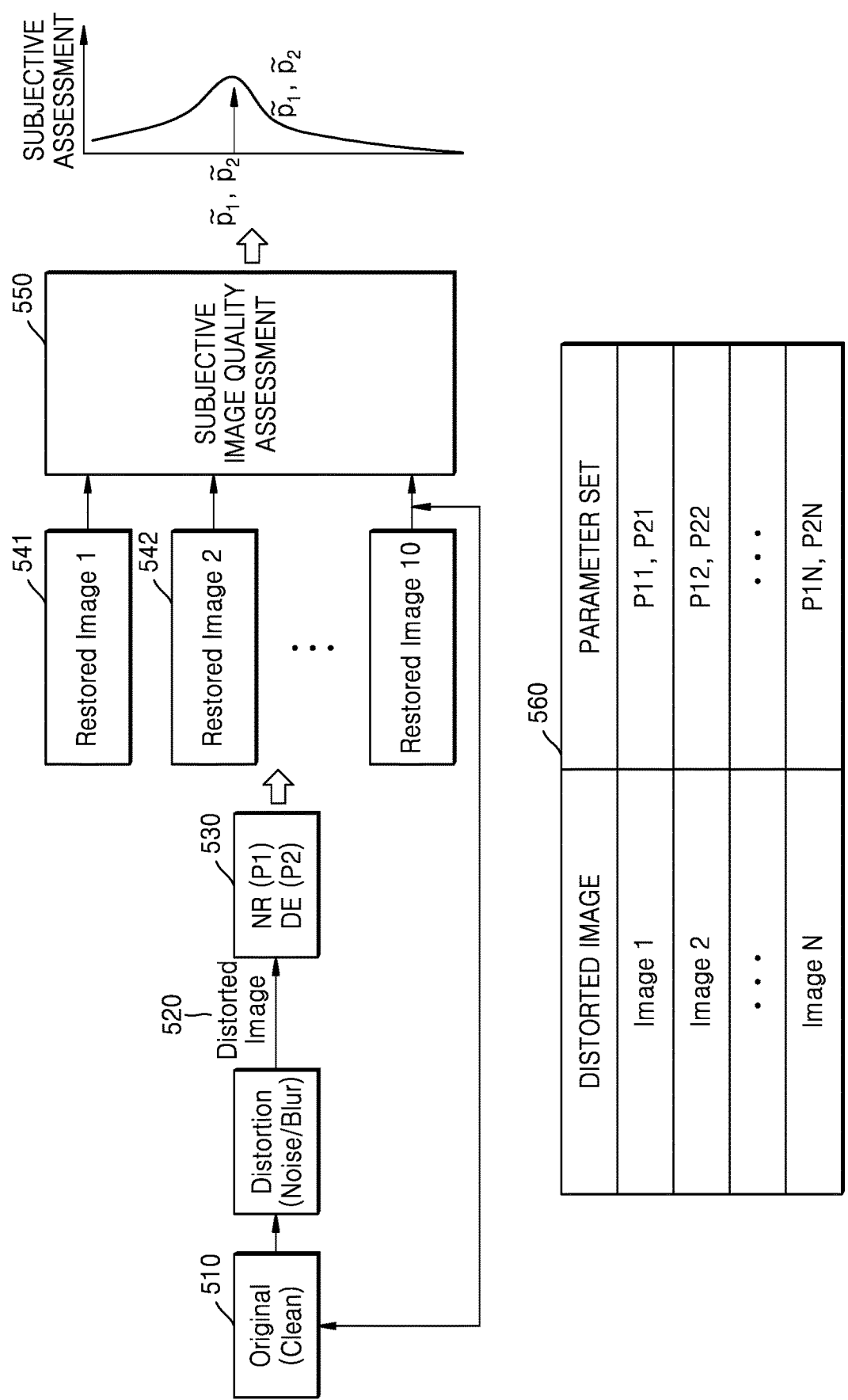
FIG. 5 is a diagram illustrating an example method of training a parametric neural network, according to various embodiments.

FIG. 5 is a diagram illustrating an example method of training a parameter neural network, according to various embodiments.

Referring to FIG. 5, a training apparatus may generate training data for training a parameter neural network according to an embodiment of the disclosure. In this case, the training apparatus may be a separate apparatus that is different from an image processing apparatus according to an embodiment of the disclosure, but is not limited thereto.

For example, the training apparatus may generate a distorted image 520 by distorting an original image 510 that does not include noise or blur. Image quality processing may be performed by applying an image quality parameter set 530 including a plurality of image quality parameters to the distorted image 520. For example, the image quality parameter set may include a pair of a noise removal parameter P1 and a detail enhancement parameter P2. However, embodiments of the disclosure are not limited thereto, and the image quality parameter set may include various other types of image quality parameters.

As shown in FIG. 5, image quality processing may be performed by applying a plurality of image quality parameter sets to the distorted image 520. In this case, each of the image quality parameter sets may include a different combination of the noise removal parameter P1 and the detail enhancement parameter P2.

The training apparatus may perform image quality processing by applying a first image quality parameter set to the distorted image 520 to thereby generate a first restored image 541 that has undergone the image quality processing, and perform image quality processing by applying a second image quality parameter set to the distorted image 520 to thereby generate a second restored image 542 that has undergone the image quality processing. In the same manner, the training apparatus may perform image quality processing by applying third through N-th image quality parameter sets to the distorted image 520, thereby generating third through N-th restored images, respectively.

The training apparatus may determine an image that is closest to the original image 510 from among the first through N-th restored images 541, 542, . . . via subjective image quality assessments 550 by multiple image quality evaluators. For example, the training apparatus may determine a restored image having a highest subjective image quality score from among the first through N-th restored images 541, 542, . . . . For example, the training apparatus may determine a parameter set P11 and P21 applied to a determined restored image as an optimal parameter set for the first distorted image Image 1 obtained by distorting a first original image.

In the same or similar manner, the training apparatus may obtain second through N-th distorted images Image 2 through Image N by respectively distorting second through N-th original images, and determine respective optimal parameter sets for the second through N-th distorted images Image 2 through Image N.

The first through N-th distorted images Image 1 through Image N and their respective optimal parameter sets may be stored as the training data 560. For example, as shown in FIG. 5, the training data 560 may include a plurality of data sets, each data set including a distorted image and an optimal parameter set for the distorted image.

In addition, while it has been described above that the training apparatus generates training data, the training apparatus may receive training data generated by an external device.

According to an embodiment of the disclosure, the training apparatus may train the parameter neural network 410 based on the training data 560. For example, according to an embodiment of the disclosure, the parameter neural network 410 may include one or more layers, and the training apparatus may determine weights included in each of the layers. The training apparatus may input the first distorted image Image 1 to the parameter neural network 410, and update weights in the layers in a direction in which a difference between an output parameter set and the optimal parameter set P11 and P21 for the first distorted image Image 1 decreases. In addition, the training apparatus may train the parameter neural network 410 by inputting each of the second through N-th distorted images Image 2 through Image N to the parameter neural network 410, and updating weights in the layers in a direction in which a difference between an output parameter set and an optimal parameter set for each of the second through N-th distorted images Image 2 through Image N decreases. However, embodiments of the disclosure are not limited thereto.

Accordingly, when an image is input, the parameter neural network 410 that has been trained may output an initial parameter set that is the most optimized for image quality processing of the image.

Referring back to FIG. 3, the parameter determiner 330 may include various processing circuitry and/or executable program instructions and determine image quality parameters to be set in the image quality processor 310 based on transmission characteristics of an image, image features, and an initial parameter set. In this case, the image quality parameters may include a first image quality parameter related to noise removal and a second image quality parameter related to detail enhancement, but is not limited thereto.

A method, performed by the parameter determiner 330, of determining image quality parameters will now be described in greater detail below with reference to FIG. 6.

Figure 6:
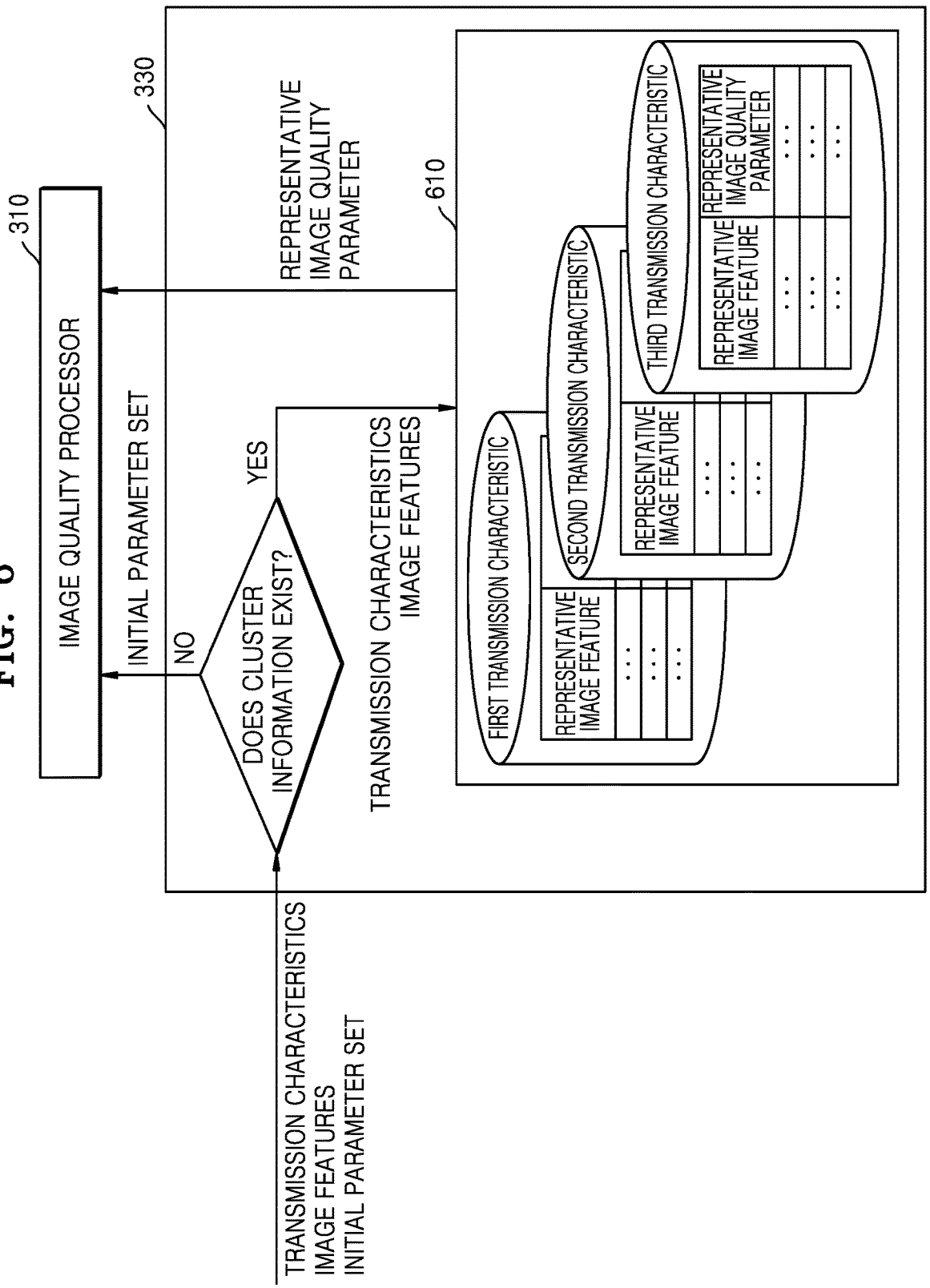
FIG. 6 is a diagram illustrating an example method of determining image quality parameters, according to various embodiments.

FIG. 6 is a diagram illustrating an example method of determining image quality parameters, according to various embodiments.

Referring to FIG. 6, the parameter determiner 330 may determine image quality parameters based on whether cluster information 610 including representative image features and representative image quality parameters is stored. For example, before clustering is performed or when the cluster information 610 received from an external device is not stored, the parameter determiner 330 may determine an initial parameter set received from the parameter calculator 320 as image quality parameters to be set in the image quality processor 310.

On the other hand, as shown in FIG. 6, when the cluster information 610 generated by performing clustering or received from the external device is stored, the parameter determiner 330 may determine image quality parameters to be set in the image quality processor 310 based on transmission characteristics and image features. For example, the cluster information 610 may include cluster tables respectively corresponding to the transmission characteristics, and each cluster table may include a plurality of clusters. In addition, each cluster includes a representative image feature and a representative image quality parameter corresponding to the representative image feature.

The parameter determiner 330 may select a cluster table corresponding to a transmission characteristic of an image from among a plurality of cluster tables, and search for a cluster in the selected cluster table, the cluster including a representative image feature that is most similar to the image features. Accordingly, the parameter determiner 330 may determine a representative image quality parameter included in the corresponding cluster as the image quality parameters to be set in the image quality processor 310.

Referring back to FIG. 3, according to an embodiment of the disclosure, the image quality processor 310 may include various processing circuitry and may include a noise remover 313 and a detail enhancer 315. However, embodiments of the disclosure are not limited thereto, and the image quality processor 310 may include components for performing various image quality processing operations.

The noise remover 313 may include various processing circuitry and/or executable program instructions and perform noise removal on the image based on the first image quality parameter P1 determined by the parameter determiner 330.

The detail enhancer 315 may include various processing circuitry and/or executable program instructions and perform detail enhancement on the image from which noise has been removed based on the second image quality parameter P2 determined by the parameter determiner 330.

An image 350 that has undergone the image quality processing may be input to the parameter updater 340. The parameter updater 340 may include various processing circuitry and/or executable program instructions and update, based on the image 350 that has undergone the image quality processing, the image quality parameters determined by the parameter determiner 330.

An operation, performed by the parameter updater 340, of updating image quality parameters will now be described in greater detail below with reference to FIGS. 7 and 8.

Figure 7:
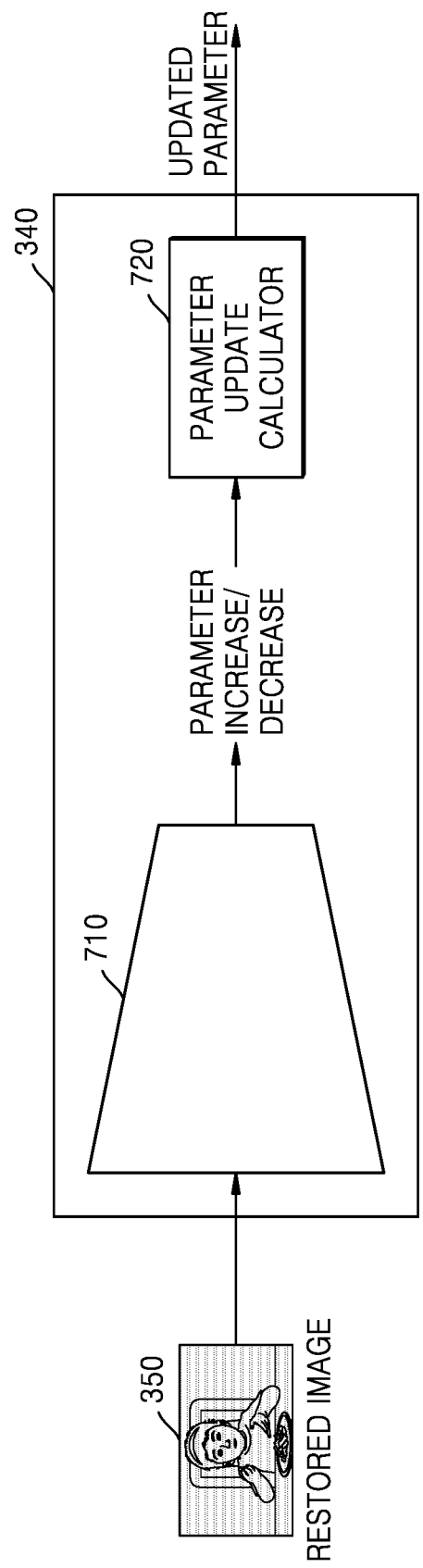
FIG. 7 is a diagram illustrating an example parameter updater according to various embodiments.

FIG. 7 is a diagram illustrating an example configuration of the parameter updater according to various embodiments.

Referring to FIG. 7, according to an embodiment of the disclosure, the parameter updater 340 may include a parameter update network 710 and a parameter update calculator 720.

The parameter update network 710 may include various circuitry and/or executable program instructions and receive a restored image that has undergone the image quality processing and output an update direction for image quality parameters. For example, when the image quality parameters include first and second image quality parameters, the update direction output from the parameter update network 710 may include a direction in which a value of the first image quality parameter increases or decreases and a direction in which a value of the second image quality parameter increases or decreases.

Figure 8:
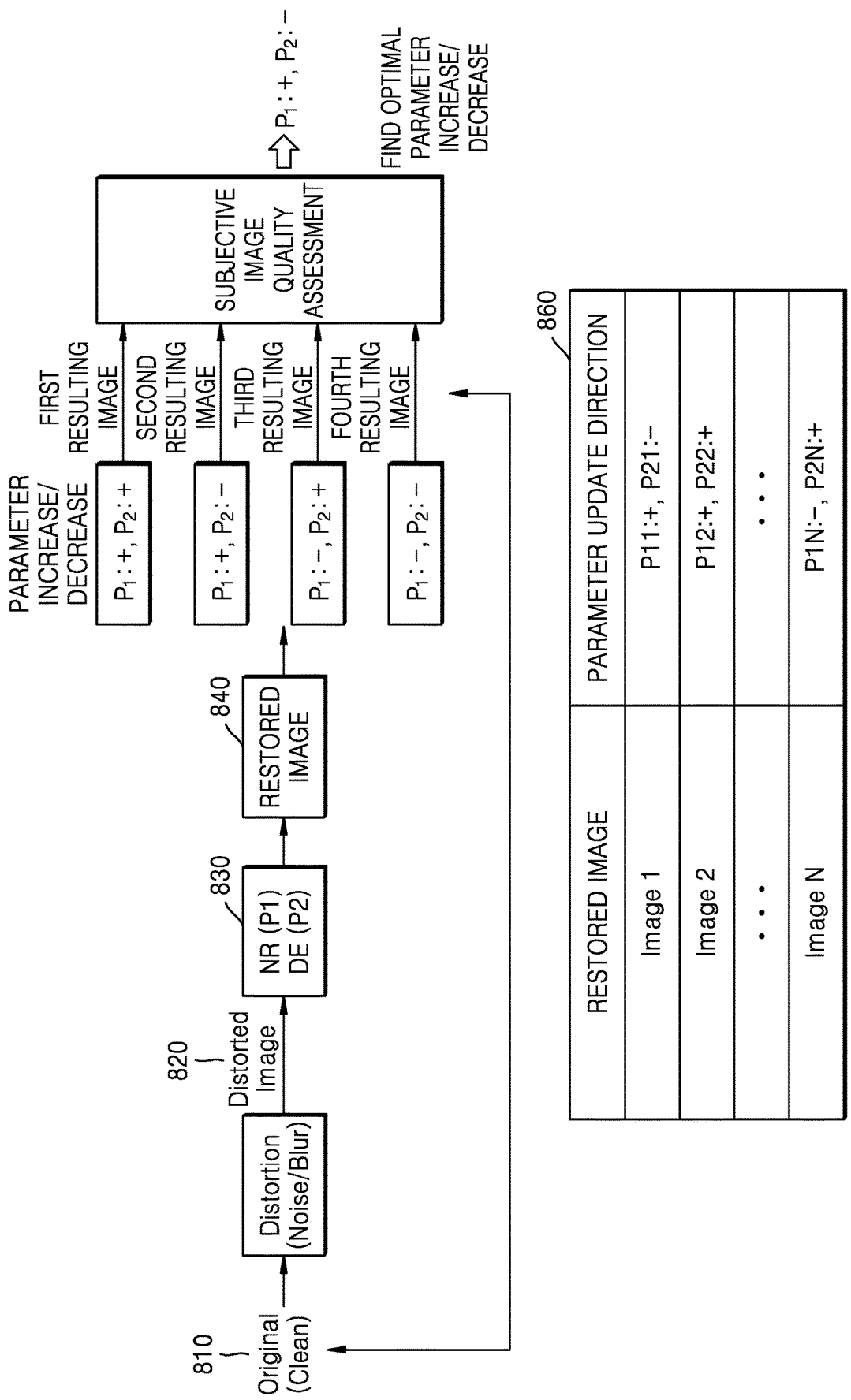
FIG. 8 is a diagram illustrating an example method of training a parameter update network, according to various embodiments.

FIG. 8 is a diagram illustrating an example method of training a parameter update network, according to various embodiments.

Referring to FIG. 8, a training apparatus may generate training data 860 used for training a parameter update network according to an embodiment of the disclosure. In this case, the training apparatus may be a separate apparatus that is different from an image processing apparatus according to an embodiment of the disclosure, but is not limited thereto.

For example, the training apparatus may generate a distorted image 820 by distorting an original image 810 that does not include noise or blur. The training apparatus may perform image quality processing by applying an image quality parameter set 830 including a plurality of image quality parameters to the distorted image 820, and may generate a restored image 840 that has undergone the image quality processing. The training apparatus may generate a plurality of restored images that have undergone image quality processing by applying an image quality parameter set to each of a plurality of distorted images or by applying a plurality of image quality parameter sets to one distorted image. For example, the plurality of restored images may include first through N-th restored images Image 1 through Image N.

The training apparatus may generate the first restored image 1 that has undergone the image quality processing based on the first image quality parameter set. The training apparatus may generate the first restored image Image1 by performing noise removal on a distorted image using a first image quality parameter P11 related to the noise removal included in the first image quality parameter set, and then performing detail enhancement on the resulting image using a second image quality parameter P21 related to the detail enhancement.

The training apparatus may obtain resulting images by performing image quality processing on the first restored image 1 based on combinations of a direction in which a value of the first image quality parameter P11 related to noise removal increases or decreases and a direction in which a value of the second image quality parameter P21 related to detail enhancement increases or decreases. By comparing the resulting images, the training apparatus may determine optimal directions for increasing/decreasing values of the first and second image quality parameters P11 and P21 applied to the image quality processing of the first restored image Image 1.

For example, the training apparatus may generate a first resulting image by performing image quality processing based on image quality parameters updated by increasing the values of the first image quality parameter related to noise removal and the second image quality parameter P21 related to detail enhancement, a second resulting image by performing image quality processing based on image quality parameters updated by increasing the value of the first image quality parameter P11 and decreasing the value of the second image quality parameter P21, a third resulting image by performing image quality processing based on image quality parameters updated by decreasing the value of the first image quality parameter P11 and increasing the value of the second image quality parameter P21, and a fourth resulting image by performing image quality processing based on image quality parameters updated by decreasing the values of the first and second image quality parameters P11 and P21.

The training apparatus may determine a resulting image that is closest to the original image 810 from among the first through fourth resulting images via subjective image quality assessments by multiple image quality evaluators. For example, the training apparatus may determine a resulting image having a highest subjective image quality score from among the first through fourth resulting images. For example, the second resulting image may have the highest subjective image quality score from among the first through fourth resulting images. The training apparatus may determine, as an optimal update direction for the first restored image Image 1, the directions in which the values of the first and second image quality parameters P11 and P21 applied to the determined resulting image (the second resulting image) increase/decrease. For example, the training apparatus may determine, as an optimal update direction, the direction in which the value of the first image quality parameter P11 increases and the direction in which the value of the second image quality parameter P21 decreases.

In the same or similar manner, the training apparatus may determine an optimal update direction for each of the second through N-th restored images Image 2 through Image N.

The training apparatus may determine directions that the values of the first and second image quality parameters P11 and P21 increase or decrease such that a difference between the first restored image Image 1 and the original image 810 is minimized and/or reduced. Furthermore, the training apparatus may determine an update direction for image quality parameters such that a difference between the original image 810 and each of the second through N-th restored images Image 2 through Image N is minimized and/or reduced.

The first through N-th restored images Image 1 through Image N and optimal update directions respectively corresponding to the first through N-th restored images Image 1 through Image N may be stored as the training data 860. For example, as shown in FIG. 8, the training data 860 may include a plurality of data sets, and each data set may include a restored image and an optimal parameter update direction for the restored image.

The training apparatus may train the parameter update network 710 according to an embodiment of the disclosure using the training data 860. For example, according to an embodiment of the disclosure, the parameter update network 710 may include one or more layers, and the training apparatus may determine weights included in each of the layers. The training apparatus may input the first restored image Image 1 to the parameter update network 710, and update weights in the layers such that an output parameter update direction is an update direction optimized for the first restored image Image 1 (e.g., a direction in which the value of the first image quality parameter P11 increases and a direction in which the value of the second image quality parameter P21 decreases). In addition, the training apparatus may train the parameter update network 710 by inputting each of the second through N-th restored images Image 2 through Image N to the parameter update network 710, and updating weights in the layers such that a parameter update direction optimized for each of the second through N-th restored images Image 2 through Image N is output. However, embodiments of the disclosure are not limited thereto.

Accordingly, when a restored image is input, the parameter update network 710 that has been trained may output an optimal update direction for image quality parameters applied to the restored image.

Referring back to FIG. 7, when the parameter update direction is output from the parameter update network 710, the parameter update calculator 720 may update the image quality parameters by increasing or decreasing a preset value in the update direction output from the parameter update network 710.

Referring back to FIG. 3, according to an embodiment of the disclosure, the parameter determiner 330 may include various processing circuitry and/or executable program instructions and generate cluster information by performing clustering based on the updated image quality parameter received from the parameter updater 340.

A method, performed by the parameter determiner 330, of generating cluster information by performing clustering will now be described in greater detail below with reference to FIG. 9.

Figure 9:
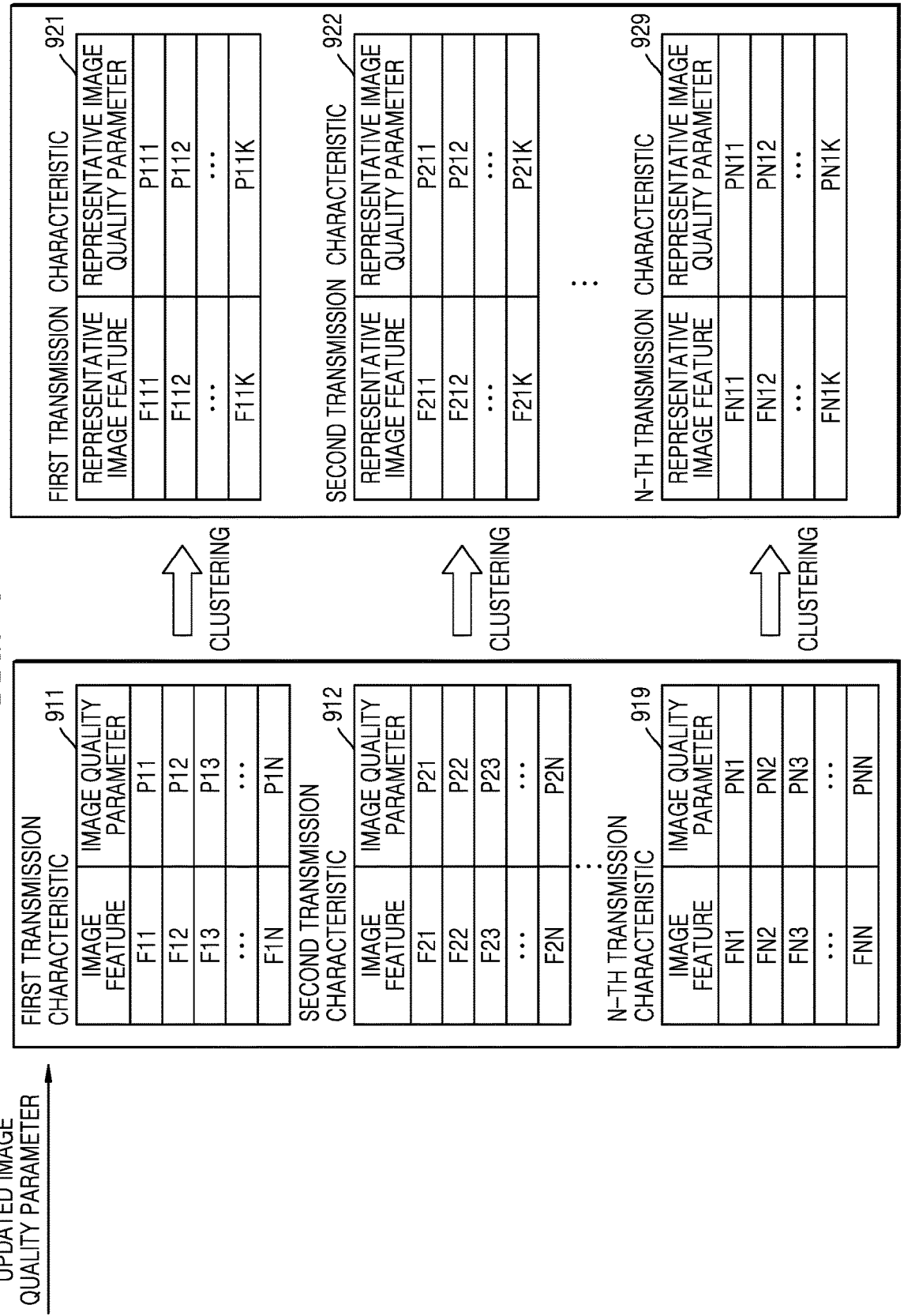
FIG. 9 is a diagram illustrating an example method of generating cluster information, according to various embodiments.

FIG. 9 is a diagram illustrating an example method of generating cluster information, according to various embodiments.

According to an embodiment of the disclosure, the parameter determiner 330 may receive and store updated image quality parameters from the parameter updater 340. In this case, the parameter determiner 330 may store the updated quality parameters for each transmission characteristic of an image. For example, as shown in FIG. 9, the parameter determiner 330 may include a first raw data table 911 corresponding to a first transmission characteristic, a second raw data table 912 corresponding to a second transmission characteristic, . . . , and an N-th raw data table 919 corresponding to an N-th transmission characteristic.

When an updated quality parameter received from the parameter updater 340 is an image quality parameter for a first image having the first transmission characteristic, the parameter determiner 330 may store, in the first raw data table 911, raw data including the updated image quality parameter and an image feature for the first image. In this case, the image feature for the first image may be received from the parameter calculator 320, as described above with reference to FIG. 3.

When the number of pieces of raw data stored in the first raw data table 911 is greater than or equal to a preset number, the parameter determiner 330 may perform clustering to generate cluster information. For example, when N pieces of raw data are stored in the first raw data table 911 corresponding to the first transmission characteristic, the parameter determiner 330 may perform clustering of the N pieces of raw data to generate a first cluster table 921 including K clusters. The parameter determiner 330 may classify N image features included in the N pieces of raw data into K groups, and determine a representative image feature based on image features included in the same group. Furthermore, the parameter determiner 330 may determine a representative image quality parameter based on updated image quality parameters included in the same group.

Each of the K groups corresponds to one cluster, and the first cluster table 921 may include the K clusters. Furthermore, each cluster may include a representative image feature and a representative image quality parameter.

In the same manner, when the number of pieces of raw data stored in the second raw data table 912 is greater than or equal to the preset number, the parameter determiner 330 may perform clustering to generate a second cluster table 922. Furthermore, when the number of pieces of raw data stored in the N-th raw data table 919 is greater than or equal to the preset number, the parameter determiner 330 may perform clustering to generate an N-th cluster table 929. However, embodiments of the disclosure are not limited thereto.

According to an embodiment of the disclosure, when clustering is completed, the parameter determiner 330 may store a generated cluster table and delete pieces of raw data stored in a corresponding raw data table. In addition, the parameter determiner 330 may continuously receive the updated image quality parameters, store them in a raw data table, and when the number of pieces of raw data in the raw data table is greater than or equal to a preset number, performs clustering again to update the existing cluster table.

When cluster information including updated cluster tables is stored, the parameter determiner 330 may determine image quality parameters to be set in the image quality processor 310 for performing image quality processing on an image based on transmission characteristics of the image, image features, and the updated cluster information.

Accordingly, according to an embodiment of the disclosure, the image processing apparatus 100 may continuously update, based on a viewing history, the image quality parameters in a direction in which quality of the image is improved, based on the viewing history.

Figure 10:
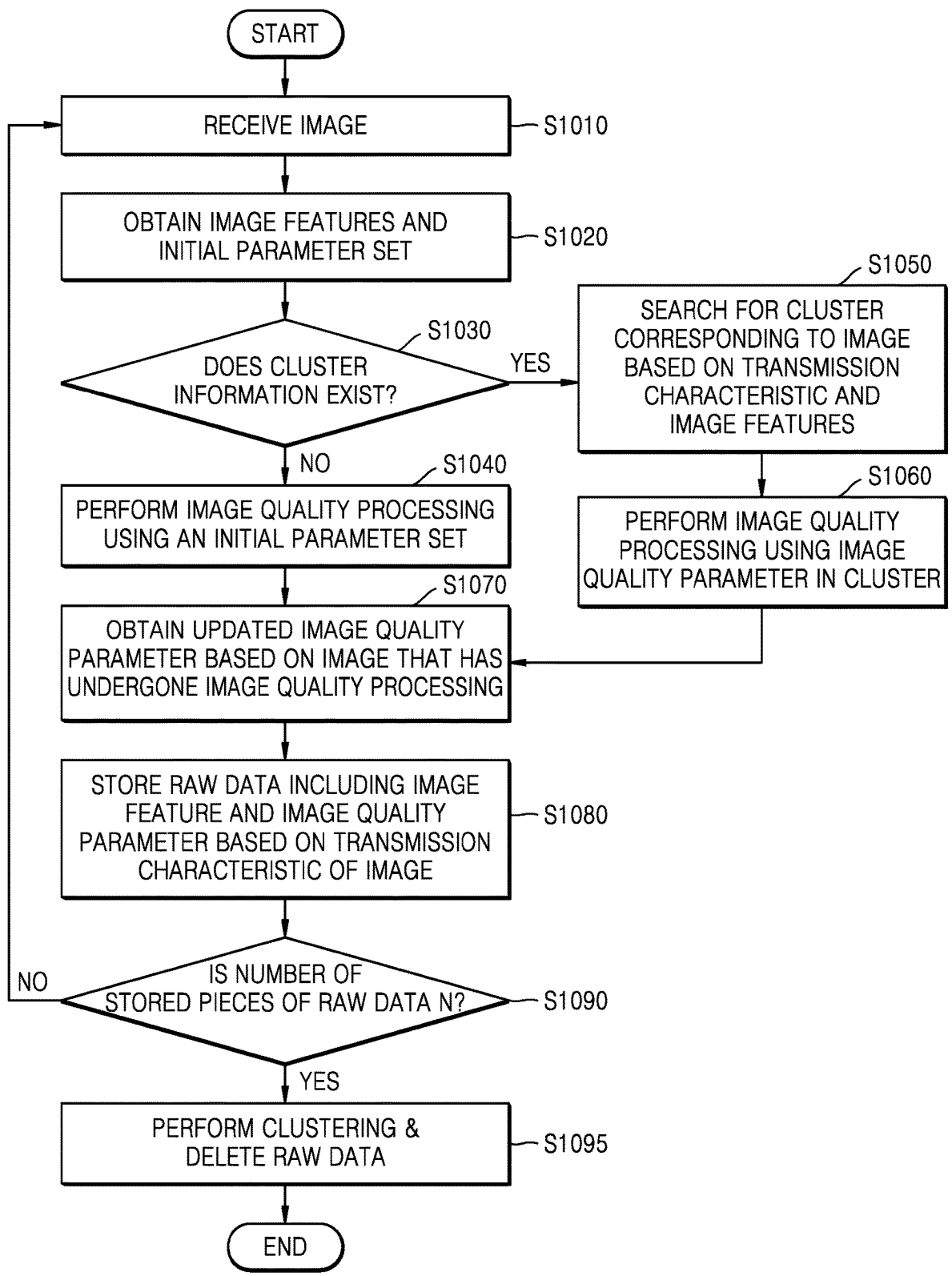
FIG. 10 is a flowchart illustrating an example method of operating an image processing apparatus, according to various embodiments.

FIG. 10 is a flowchart illustrating an example method of operating the image processing apparatus 100, according to various embodiments.

Referring to FIG. 10, according to an embodiment of the disclosure, the image processing apparatus 100 may receive an image (operation S1010). Furthermore, the image processing apparatus 100 may receive characteristics of the image together. For example, the characteristics of the image may include transmission characteristics of the image, and the transmission characteristics of the image may include an image resolution, a bitrate, source information, etc. However, embodiments of the disclosure are not limited thereto.

The image processing apparatus 100 may obtain image features and an initial parameter set for the received image (operation S1020).

For example, the image processing apparatus 100 may obtain image features and an initial parameter set for an image using a parameter neural network. In this case, the parameter neural network according to an embodiment of the disclosure may be a network trained to receive an image and output an initial parameter set most optimized for image quality processing of the received image. Because the parameter neural network has been described in detail above with reference to FIGS. 4 and 5, a detailed description thereof may not be repeated here.

The image processing apparatus 100 checks whether prestored cluster information exists (operation S1030), and when the prestored cluster information does not exist ("No" in operation S1030), the image processing apparatus 100 may perform image quality processing using the initial parameter set obtained in operation S1020 (operation S1040).

According to an embodiment of the disclosure, the image quality processing may include, for example, image noise removal, image detail enhancement, etc. The image processing apparatus 100 may perform noise removal on the image based on a first image quality parameter included in the initial parameter set obtained in operation S1020, and then perform detail enhancement on the image from which noise has been removed based on a second image quality parameter. However, embodiments of the disclosure are not limited thereto, and the image processing apparatus 100 may perform detail enhancement followed by noise removal.

On the other hand, when the cluster information exists ("Yes" in operation S1030), the image processing apparatus 100 may search for a cluster corresponding to the image, based on the transmission characteristics and the image features obtained in the operation S1020 (operation S1050). For example, the image processing apparatus 100 may select a cluster table from cluster information according to a transmission characteristic and then select one of a plurality of clusters included in the selected cluster table based on the image features. In this case, each of the plurality of clusters may include a representative image feature and a representative image quality parameter, and the image processing apparatus 100 may select, from among the plurality of clusters in the selected cluster table, a cluster including a representative image feature that is most similar to the image features obtained in operation S1020.

The image processing apparatus 100 may perform image quality processing using a representative image quality parameter included in the selected cluster (operation S1060).

The image processing apparatus 100 may obtain an updated image quality parameter based on an image that has undergone the image quality processing (operation S1070).

For example, the image processing apparatus 100 may determine an update direction for image quality parameters using a parameter update network. The parameter update network according to an embodiment of the disclosure may be a network that receives a restored image that has undergone the image quality processing and outputs an update direction for image quality parameters applied to the image. Because the parameter update network has been described in detail above with reference to FIGS. 7 and 8, a detailed description thereof may not be repeated here.

For example, when a restored image to which first and second image quality parameters are applied is input to the parameter update network, the parameter update network may output an update direction indicating whether the first image quality parameter is to be increased or decreased and whether the second image quality parameter is to be increased or decreased.

When the update direction for the image quality parameters is obtained, the image processing apparatus 100 may update the image quality parameters by increasing or decreasing a preset value in the update direction.

The image processing apparatus 100 may store the updated image quality parameters for each transmission characteristic of the image. For example, the image processing apparatus 100 may generate a first raw data table corresponding to a first transmission characteristic, a second raw data table corresponding to a second transmission characteristic, an N-th raw data table corresponding to an N-th transmission characteristic, etc.

The image processing apparatus 100 may store, based on a transmission characteristic of the image, raw data including an image feature and an updated image quality parameter in a corresponding raw data table (operation S1080). For example, when the updated image quality parameter is an image quality parameter for a first image having the first transmission characteristic, the image processing apparatus 100 may store, in the first raw data table, raw data including the updated image quality parameter and image features for the first image. When the updated image quality parameter is an image quality parameter for a second image having the N-th transmission characteristic, the image processing apparatus 100 may store, in the N-th raw data table, raw data including the updated image quality parameter and image features for the second image.

The image processing apparatus 100 may determine whether the number of pieces of raw data stored in a raw data table is a preset (e.g., specified) number (operation S1090), and perform clustering and delete raw data when the number of pieces of raw data is the preset number (operation S1095).

For example, when N pieces of raw data are stored in the first raw data table, the image processing apparatus 100 may perform clustering to generate or update a first cluster table 921 including K clusters.

The image processing apparatus 100 may classify N image features included in the N pieces of raw data into K groups according to a preset criterion, and determine a representative image feature based on image features included in the same group. Furthermore, the image processing apparatus 100 may determine a representative image quality parameter based on updated image quality parameters included in the same group. Each of the K groups corresponds to one cluster, and a first cluster table may include the K clusters. Furthermore, each cluster may include a representative image feature and a representative image quality parameter.

When clustering for the first raw data table is completed to generate the first cluster table, the N pieces of raw data stored in the first raw data table may be deleted.

In the same manner, the image processing apparatus 100 m may generate or update second through N-th cluster tables by performing clustering on raw data tables respectively corresponding to the second through N-th transmission characteristics.

Figure 11:
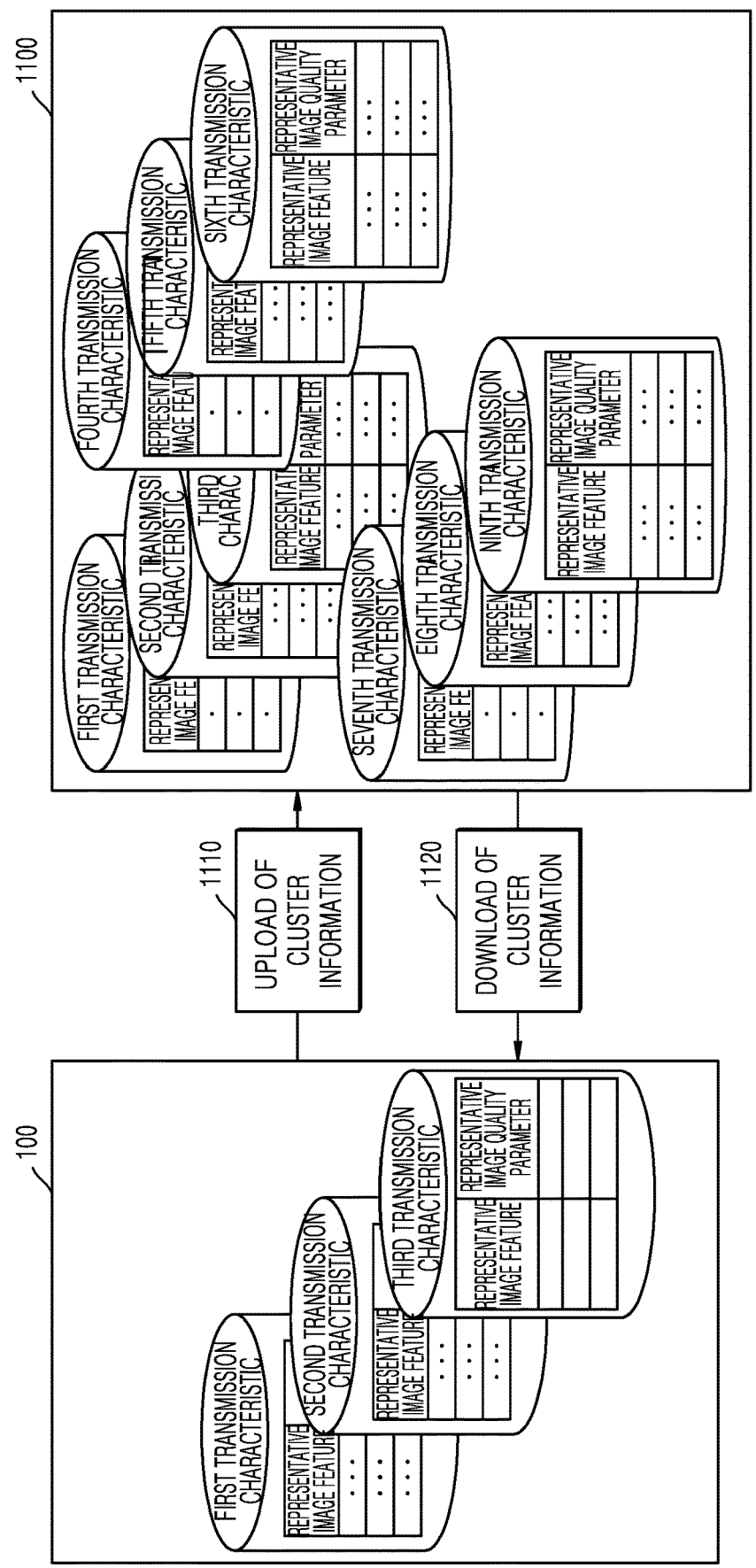
FIG. 11 is a diagram illustrating an example operation of an image processing apparatus transmitting and receiving cluster information to and from an external server, according to various embodiments.

FIG. 11 is a diagram illustrating an example operation of the image processing apparatus transmitting and receiving cluster information to and from an external server, according to various embodiments.

Referring to FIG. 11, according to an embodiment of the disclosure, the image processing apparatus 100 may transmit cluster information to an external server 1100 (1110). For example, the image processing apparatus 100 may perform clustering based on updated image quality parameters and when cluster information is obtained, transmit (upload) the cluster information to the external server 1100. In addition, when the cluster information is updated or periodically, the image processing apparatus 100 may transmit the updated cluster information to the external server 1100.

According to an embodiment of the disclosure, the external server 1100 may transmit or receive pieces of cluster information to or from a plurality of image processing apparatuses via at least one communication network. The external server 1100 may store the pieces of cluster information received from the plurality of image processing apparatuses in a database (DB) for management.

Furthermore, the external server 1100 may update existing cluster information stored in the DB, based on the pieces of cluster information received from the plurality of image processing apparatuses.

In addition, the image processing apparatus 100 may receive (download) cluster information from the external server 1100 (1120). According to an embodiment of the disclosure, when cluster information not stored in the image processing apparatus 100 is stored in the external server 1100, the image processing apparatus 100 may request the cluster information from the external server 1100, and the external server 1100 may transmit the requested cluster information to the image processing apparatus 100.

For example, as shown in FIG. 11, in a state in which only the first through third cluster tables respectively corresponding to the first through third transmission characteristics are stored in the image processing apparatus 100, the image processing an image having a fourth transmission characteristic may be input to the image processing apparatus 100. In this case, the image processing apparatus 100 may request cluster information corresponding to the fourth transmission characteristic from the external server 1100.

In response to the request, the external server 1100 may search the DB for cluster information (e.g., a fourth cluster table) corresponding to the fourth transmission characteristic and transmit the fourth cluster table to the image processing apparatus 100.

The image processing apparatus 100 may determine an image quality parameter for the image having the fourth transmission characteristic based on the fourth cluster table received from the external server 1100, and perform image quality processing using the determined image quality parameter.

Thus, according to an embodiment of the disclosure, the image processing apparatus 100 may perform image quality processing even on an image having no viewing history using an optimized image quality parameter. In addition, the image processing apparatus 100 may solve a problem of hardware resource constraints thereon by downloading necessary cluster information from the external server 100 for use without needing to store all pieces of cluster information.

Figure 12:
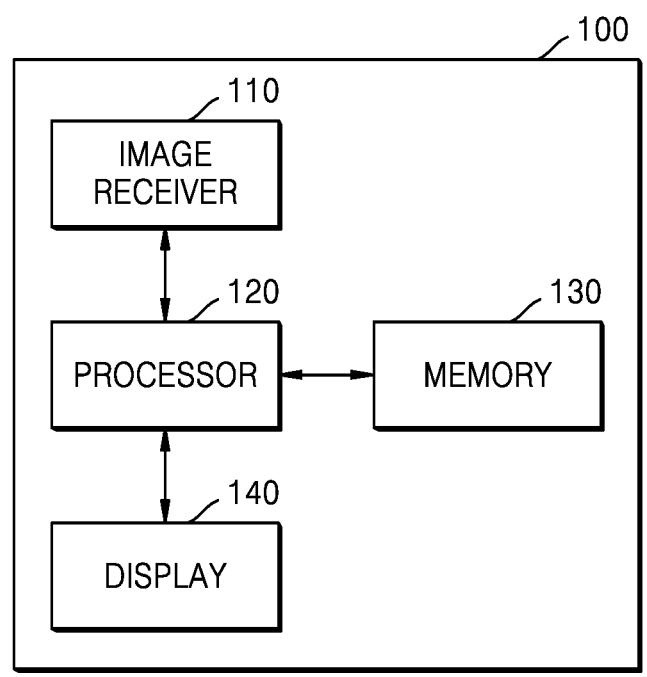
FIG. 12 is a block diagram illustrating an example configuration of an image processing apparatus according to various embodiments.

FIG. 12 is a block diagram illustrating an example configuration of an image processing apparatus according to various embodiments.

Referring to 12, the image processing apparatus 100 according to the embodiment of the disclosure may include an image receiver (e.g., including image receiving circuitry) 110, a processor (e.g., including processing circuitry) 120, a memory 130, and a display 140.

According to an embodiment of the disclosure, the image receiver 110 may include various circuitry and may include a communication interface, an input/output (I/O) interface, etc. For example, the communication interface may transmit or receive data or signals to or from an external device or server. For example, the communication interface may include a Wi-Fi module, a Bluetooth module, an infrared communication module, a wireless communication module, a local area network (LAN) module, an Ethernet module, a wired communication module, etc. In this case, each communication module may be implemented in the form of at least one hardware chip.

The Wi-Fi module and the Bluetooth module perform communication using a Wi-Fi method and a Bluetooth method, respectively. When using the Wi-Fi module or Bluetooth module, the communication interface may transmit and receive various types of connection information such as a session identifier (SSID), a session key, etc., perform communication connection using the connection information, and then transmit and receive various types of information. The wireless communication module may include at least one communication chip that performs communication according to various wireless communication standards such as Zigbee, $3^{rd}$ generation (3G), 3G Partnership Project (3GPP), Long Term Evolution (LTE), LTE Advanced (LTE-A), $4^{th}$ generation (4G), $5^{th}$ generation (5G), etc.

The I/O interface receives video (e.g., a moving image, etc.), audio (e.g., a voice, music, etc.), additional information (e.g., an electronic program guide (EPG), etc.), and the like from outside of the image processing apparatus 100. The I/O interface may include one of a High-Definition Multimedia Interface (HDMI), a Mobile High-Definition Link (MHL), a Universal Serial Bus (USB), a Display Port (DP), Thunderbolt, a Video Graphics Array (VGA) port, an RGB port, D-subminiature (D-SUB), a Digital Visual Interface (DVI), a component jack, and a PC port.

According to an embodiment of the disclosure, the image receiver 110 may receive one or more images. In this case, the image receiver 110 may also receive transmission characteristics (e.g., an input resolution, a bitrate, information about an image source, etc.) of the image.

According to an embodiment of the disclosure, the processor 120 may include various processing circuitry and controls all operations of the image processing apparatus 100 and a flow of signals between the internal components of the image processing apparatus 100 and processes data.

The processor 120 may include a single core, a dual core, a triple core, a quad core, or a multiple number of cores therein. Furthermore, the processor 120 may include a plurality of processors. For example, the processor 120 may be implemented as a main processor (not shown) and a sub processor (not shown) operating in a sleep mode.

Furthermore, the processor 120 may include, for example, and without limitation, at least one of a central processing unit (CPU), a dedicated processor, a graphics processing unit (GPU), a video processing unit (VPU), etc. According to an embodiment of the disclosure, the processor 120 may be implemented as a system on chip (SOC) in which at least one of the CPU, the dedicated processor, the GPU, and/or the VPU is integrated.

According to an embodiment of the disclosure, the memory 130 may store various pieces of data, programs, or applications for driving and controlling the image processing apparatus 100.

A program stored in the memory 130 may include one or more instructions. Furthermore, a program (one or more instructions) or an application stored in the memory 130 may be executed by the processor 120.

According to an embodiment of the disclosure, the processor 120 may include at least one of the image quality processor 310, the parameter calculator 320, the parameter determiner 330, or the parameter updater 340 of FIG. 3.

According to an embodiment of the disclosure, the processor 120 may obtain image features and an initial parameter set for a received image. The processor 120 may obtain the image features and an initial parameter set for an image using a parametric neural network. The processor 120 may check whether prestored cluster information exists, and when the prestored cluster information does not exist, perform image quality processing using the initial parameter set. In this case, the image quality processing may include image noise removal, image detail enhancement, etc.

On the other hand, when the cluster information exists, the processor 120 may search for a cluster corresponding to the image, based on a transmission characteristic of the image and the image features. For example, the processor 120 may select a cluster table from the cluster information according to the transmission characteristic. Each cluster table may include a plurality of clusters, and each of the plurality of clusters may include a representative image feature and a representative image quality parameter. The processor 120 may select, from among the plurality of clusters, a cluster including a representative image feature that is most similar to the image features, and perform image quality processing using a representative image quality parameter included in the selected cluster.

The processor 120 may obtain updated image quality parameters based on an image that has undergone the image quality processing. For example, the processor 120 may determine an update direction for image quality parameters using a parameter update network.

When the update direction for the image quality parameters is obtained, the processor 120 may update the image quality parameters by increasing or decreasing a preset value in the update direction. The processor 120 may store the updated image quality parameters for each transmission characteristic of the image. The processor 120 may perform clustering using the updated image quality parameters. For example, when a preset number of updated image quality parameters are stored, the processor 120 may perform clustering to generate or update cluster information.

The processor 120 may improve the quality of the image by performing image quality processing using image quality parameters included in the updated cluster information.

According to an embodiment of the disclosure, the display 140 generates a driving signal by converting an image signal, a data signal, an on screen display (OSD) signal, a control signal, etc. processed by the processor 120. The display 140 may be implemented as a plasma display panel (PDP), a liquid crystal display (LCD), an organic light-emitting diode (OLED) display, a flexible display, etc., and may also be implemented as a three-dimensional (3D) display. Furthermore, the display 140 may be configured as a touch screen and used as an input device as well as an output device.

According to an embodiment of the disclosure, the display 140 may display an image that has undergone image quality processing using the image quality parameters.

Figure 13:
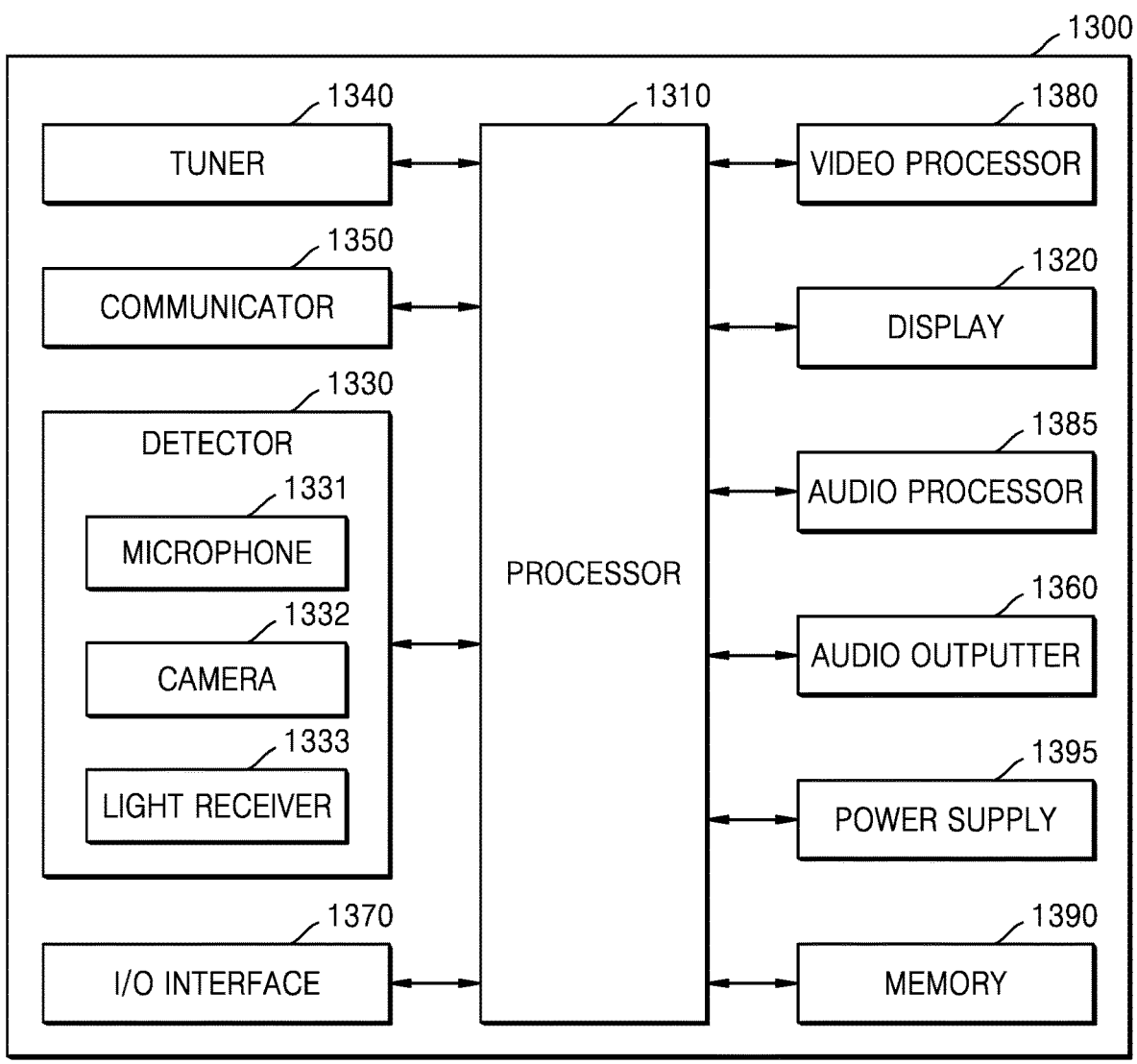
FIG. 13 is a block diagram illustrating an example configuration of an image processing apparatus according to various embodiments.

FIG. 13 is a block diagram illustrating an example configuration of an image processing apparatus 1300 according to various embodiments.

Referring to FIG. 13, the image processing apparatus 1300 may be an example of the image processing apparatus 100 described with reference to FIGS. 1 through 12.

Referring to FIG. 13, according to an embodiment of the disclosure, the image processing apparatus 1300 may include a tuner 1340, a processor (e.g., including processing circuitry) 1310, a display 1320, a communicator (e.g., including communication circuitry) 1350, a detector (e.g., including detecting circuitry) 1330, an I/O interface (e.g., including I/O circuitry) 1370, a video processor (e.g., including video processing circuitry) 1380, an audio processor (e.g., including audio processing circuitry) 1385, an audio outputter (e.g., including audio output circuitry) 1360, a memory 1390, and a power supply 1395.

The communicator 1350 and the I/O interface 1370 of FIG. 13 respectively correspond to the communication interface and the I/O interface included in the image receiver 110 of FIG. 12, and the processor 1310, the memory 1390, and the display 1320 of FIG. 13 respectively correspond to the processor 120, the memory 130, and the display 140 of FIG. 12. Thus, descriptions that are already provided above may not be repeated below.

According to an embodiment of the disclosure, via amplification, mixing, resonance, etc. of a broadcast signal received in a wired or wireless manner, the tuner 1340 may tune and then select only a frequency of a channel that is to be received by the image processing apparatus 100 from among many radio wave components. The broadcast signal may include audio, video, and additional information (e.g., an EPG).

The tuner 1340 may receive broadcast signals from various sources such as terrestrial broadcasting, cable broadcasting, satellite broadcasting, Internet broadcasting, etc. The tuner 1340 may receive broadcast signals from sources such as analog broadcasting, digital broadcasting, etc.

The detector 1330 may include various detecting circuitry and detect a user's voice, images, or interactions, and may include, for example, a microphone 1331, a camera 1332, and a light receiver 1333.

The microphone 1331 receives a voice uttered by the user. The microphone 1331 may convert the received voice into an electrical signal and output the electrical signal to the processor 1310. For example, the user's voice may include a voice corresponding to a menu or function of the image processing apparatus 1300.

The camera 1332 may receive an image (e.g., consecutive frames) corresponding to a user's motion including his or her gesture performed within a recognition range of the camera 1332. The processor 1310 may select a menu displayed by the image processing apparatus 1300 based on a recognition result of the received motion or perform control corresponding to the recognition result.

The light receiver 1333 receives an optical signal (including a control signal) from an external control device via a light window (not shown) on a bezel of the display 1320. The light receiver 1333 may receive an optical signal corresponding to a user input (e.g., touching, pressing, touch gesture, voice, or motion) from a control device. A control signal may be extracted from the received optical signal according to control by the processor 1310.

The processor 1310 may include various processing circuitry and controls all operations of the image processing apparatus 1300 and a flow of signals between the internal components of the image processing apparatus 1300 and perform a function of processing data. When there is an input by the user or preset and stored conditions are satisfied, the processor 1310 may execute an operating system (OS) and various applications stored in the memory 1390.

The processor 1310 may include RAM (not shown) that stores signals or data input from outside of the image processing apparatus 1300 or is used as a storage area corresponding to various operations performed by the image processing apparatus 1300, and ROM (not shown) that store control programs for controlling the image processing apparatus 1300.

The video processor 1380 may include various video processing circuitry and processes video data received by the image processing apparatus 1300. The video processor 1380 may perform various types of image processing, such as decoding, scaling, noise removal, frame rate conversion, and resolution conversion, on the video data.

The audio processor 1385 may include various audio processing circuitry and processes audio data. The audio processor 1385 may perform various types of processing, such as decoding, amplification, noise removal, etc., on the audio data. Moreover, the audio processor 1385 may include a plurality of audio processing modules to process audios corresponding to a plurality of pieces of content.

The audio outputter 1360 may include various audio output circuitry and outputs audio in a broadcast signal received via the tuner 1340 according to control by the processor 1310. The audio outputter 1360 may output audio (e.g., a voice, sound) input via the communicator 1350 or the I/O interface 1370. Furthermore, the audio outputter 1360 may output audio stored in the memory 1390 according to control by the processor 1310. The audio outputter 1360 may include at least one of a speaker, a headphone output terminal, or a Sony/Phillips Digital Interface (S/PDIF) output terminal.

The power supply 1395 supplies, according to control by the processor 1310, power input from an external power source to the internal components of the image processing apparatus 1300. The power supply 1395 may also supply, according to control by the processor 1310, power output from one or more batteries (not shown) in the image processing apparatus 1300 to the internal components thereof.

The memory 1390 may store, according to control by the processor 1310, various pieces of data, programs, or applications for driving and controlling the image processing apparatus 1300. Although not shown in FIG. 13, the memory 1390 may include a broadcast reception module, a channel control module, a volume control module, a communication control module, a voice recognition module, a motion recognition module, a light reception module, a display control module, an audio control module, an external input control module, a power supply control module, a power supply control module for an external device connected wirelessly (e.g., via Bluetooth), a voice DB, or a motion DB. Modules and DBs (not shown) of the memory 1390 may be implemented in the form of software to perform, in the image processing apparatus 1300, a broadcast reception control function, a channel control function, a volume control function, a communication control function, a voice recognition function, a motion recognition function, a light reception control function, a display control function, an audio control function, an external input control function, a power supply control function, or a power control function of an external device connected wirelessly (e.g., via Bluetooth). The processor 1310 may perform the respective functions using the corresponding software stored in the memory 1390.

Moreover, the block diagrams of the image processing apparatuses 100 and 1300 of FIGS. 12 and 13 may be provided for illustration of embodiments of the disclosure. Each of the components in the block diagram may be integrated, added, or omitted according to the specification of the image processing apparatus 100 or 1300 that is actually implemented. In other words, two or more components may be combined into a single component, or a single component may be split into two or more components when necessary. Functions performed in each block are intended to describe the embodiments of the disclosure, and a specific operation or apparatus related to the functions does not limit the scope of the disclosure.

Operation methods of an image processing apparatus according to embodiments of the disclosure may be implemented in the form of program instructions executable by various types of computers and may be recorded on computer-readable recording media. The computer-readable recording media may include program instructions, data files, data structures, etc. either alone or in combination. The program instructions recorded on the computer-readable recording media may be designed and configured specially for the disclosure or may be known to and be usable by those skilled in the art of computer software. Examples of the computer-readable recording media include magnetic media such as hard disks, floppy disks, and magnetic tape, optical media such as compact disk ROM (CD-ROM) and digital versatile disks (DVDs), magneto-optical media such as floptical disks, and hardware devices that are specially configured to store and perform program instructions, such as ROM, RAM, flash memory, etc. Examples of program instructions include not only machine code such as that generated by a compiler but also high-level language code executable by a computer using an interpreter or the like.

Furthermore, operation methods of an image processing apparatus according to embodiments of the disclosure may be included in a computer program product when provided. The computer program product may be traded, as a product, between a seller and a buyer.

The computer program product may include a software program and a computer-readable storage medium having stored thereon the software program. For example, the computer program product may include a product (e.g. a downloadable application) in the form of a software program electronically distributed by a manufacturer of the image processing apparatus or through an electronic market. For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system including a server and a client device, the computer program product may include a storage medium of the server or a storage medium of the client device. In a case where a third device (e.g., a smartphone) is communicatively connected to the server or client device, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to embodiments of the disclosure. Two or more of the server, the client device, and the third device may execute the computer program product to perform the methods according to the embodiments of the disclosure in a distributed manner.

For example, the server (e.g., a cloud server, an artificial intelligence (AI) server, or the like) may execute the computer program product stored therein to control the client device communicatively connected to the server to perform the methods according to the embodiments of the disclosure.

While the disclosure has been illustrated and described with reference to various example embodiments, it will be understood that the various example embodiments are intended to be illustrative, not limiting. It will be further understood that the scope of the disclosure is not limited to the embodiments of the disclosure and various modifications and improvements made by those of ordinary skill in the art based on a basic concept of the disclosure also fall within the scope of the disclosure, including the appended claims. It will also be understood that any of the embodiment(s) described herein may be used in conjunction with any other embodiment(s) described herein.

What is claimed is:

1. An image processing apparatus comprising:
   a memory storing one or more instructions; and
   a processor by executing the one or more instructions stored in the memory is configured to:
   extract a first image feature from a first image;
   search for, based on a transmission characteristic of the first image and the first image feature, a first cluster corresponding to the first image from among a plurality of clusters stored in the image processing apparatus, each cluster including a representative image feature and a representative image quality parameter;
   perform image quality processing on the first image based on a first representative image quality parameter in the first cluster;
   obtain, based on the first image that has undergone the image quality processing, a first update parameter obtained by updating the first representative image quality parameter; and
   update the plurality of clusters based on the first update parameter.

2. The image processing apparatus of claim 1, wherein the processor is further configured to:
   obtain an image feature and an initial parameter corresponding to each of a plurality of images;
   perform image quality processing on each of the plurality of images based on the obtained initial parameter, and
   obtain, based on an image that has undergone the image quality processing, an update parameter obtained by updating the initial parameter; and
   generate the plurality of clusters using transmission characteristics, image features, and update parameters respectively corresponding to the plurality of images.

3. The image processing apparatus of claim 2, wherein the processor is further configured to obtain the image feature and the initial parameter corresponding to each of the plurality of images using a parameter neural network.

4. The image processing apparatus of claim 2, wherein the processor is further configured to:
   determine an update direction for the initial parameter based on the image that has undergone the image quality processing; and
   obtain the update parameter by updating the initial parameter by applying a specified value in the update direction.

5. The image processing apparatus of claim 4, wherein the processor is further configured to determine, using a parameter update neural network, the update direction indicating whether to increase or decrease a value of the initial parameter applied to the image that has undergone the image quality processing.

6. The image processing apparatus of claim 2, wherein the processor is further configured to:
   group, based on the transmission characteristics of the plurality of images, pieces of raw data including image features and update parameters respectively corresponding to the plurality of images;
   perform clustering to classify pieces of raw data in a same group into K clusters; and
   determine, based on pieces of raw data included in a same cluster, the representative image feature and the representative image quality parameter for each of the plurality of clusters.

7. The image processing apparatus of claim 6, wherein the processor is further configured to perform the clustering based on the number of the pieces of raw data in the same group being greater than or equal to a specified number.

8. The image processing apparatus of claim 1, further comprising a communicator comprising communication circuitry,
   wherein the processor is further configured to control the communicator to receive cluster information including the plurality of clusters from an external server.

9. The image processing apparatus of claim 8, wherein the processor is further configured to control the communicator to transmit the transmission characteristic of the first image to the external server and receive cluster information corresponding to the transmission characteristic of the first image from the external server.

10. The image processing apparatus of claim 8, wherein the processor is further configured to control the communicator to transmit the cluster information including the plurality of clusters to the external server.

11. A method of operating an image processing apparatus, the method comprising:
   extracting a first image feature from a first image;
   searching for, based on a transmission characteristic of the first image and the first image feature, a first cluster corresponding to the first image from among a plurality of clusters stored in the image processing apparatus, each cluster including a representative image feature and a representative image quality parameter;
   performing image quality processing on the first image based on a first representative image quality parameter in the first cluster;

obtaining, based on the first image that has undergone the image quality processing, a first update parameter obtained by updating the first representative image quality parameter; and updating the plurality of clusters based on the first update parameter.

12. The method of claim 11, further comprising:

obtaining an image feature and an initial parameter corresponding to each of a plurality of images;

performing image quality processing on each of the plurality of images based on the obtained initial parameter;

obtaining, based on an image that has undergone the image quality processing, an update parameter obtained by updating the initial parameter; and generating the plurality of clusters using transmission characteristics, image features, and update parameters respectively corresponding to the plurality of images.

13. The method of claim 12, wherein the obtaining of the image feature and the initial parameter corresponding to each of the plurality of images comprises obtaining the image feature and the initial parameter corresponding to each of the plurality of images using a parameter neural network.

14. The method of claim 12, wherein the obtaining of the update parameter obtained by updating the initial parameter based on the image that has undergone the image quality processing comprises:

determining an update direction for the initial parameter based on the image that has undergone the image quality processing; and obtaining the update parameter by updating the initial parameter by applying a specified value in the update direction.

15. A non-transitory computer-readable recording media having stored thereon a computer program, which when executed by a computer, causes the computer to perform operations corresponding to the method of claim 11.

* * * * *